United States Patent
Yamada et al.

(10) Patent No.: US 6,898,716 B2
(45) Date of Patent: May 24, 2005

(54) INFORMATION DEVICE SYSTEM

(75) Inventors: Isamu Yamada, Kawasaki (JP); Akira Shiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 09/812,813

(22) Filed: Mar. 21, 2001

(65) Prior Publication Data

US 2002/0032786 A1 Mar. 14, 2002

(30) Foreign Application Priority Data

Aug. 7, 2000 (JP) .................................... 2000-238968

(51) Int. Cl.[7] .............................. H04L 9/00; H04L 9/32; G06F 15/16
(52) U.S. Cl. ..................... 713/200; 713/166; 709/230; 709/204; 709/227; 709/220; 709/218; 709/201; 709/246; 725/9
(58) Field of Search .................... 713/166; 709/220, 709/204, 201, 218, 230, 246; 725/9; 455/436, 440, 11.1

(56) References Cited

U.S. PATENT DOCUMENTS 6,377,805 B1 * 4/2002 Anvekar et al. ............ 455/436
6,691,150 B1 * 2/2004 Yoshino et al. ............ 709/201
6,728,765 B2 * 4/2004 Yoshino et al. ............ 709/220

* cited by examiner

Primary Examiner—Ly V. Hua
(74) Attorney, Agent, or Firm—Staas & Halsey LLP

(57) ABSTRACT

An information device system includes a terminal device and a personal computer. The terminal device has a USB interface and a wireless transceiver circuit. The personal computer has a USB controller which can communicate with the USB interface of the terminal device when they are connected with each other, and also a transceiver circuit adapted to wirelessly communicate with the wireless transceiver circuit of the terminal device. A record medium, which can be read by the personal computer, contains a program for judging what communication state the system is in, a cable communication state, a wireless communication state, or a non-communication state, and restricting processing the personal computer can perform in accordance with the result of the judgment. The degree of restriction is lowest when the system is in the cable communication state, intermediate when the system is in the wireless communication state, and highest when the system is in the non-communication state.

5 Claims, 5 Drawing Sheets

INFORMATION DEVICE SYSTEM

This invention relates to an information device system which includes a plurality of information devices each having a cable communications device and a wireless communication device.

BACKGROUND OF THE INVENTION

Known systems for transferring data between plural information devices include cable communication systems using Ethernet and wireless LAN systems using IEEE 802.11 or IrDA. Bluetooth has been proposed as a system for wireless data transfer between a computer and devices used with the computer. Known cable systems for transferring data between a computer and peripheral devices include USB, PCMCIA or IEEE1394 interfaces. Personal computers with such cable communication means are commonplace. Also, personal computers with wireless interface will be realized at low costs soon.

With wireless systems, communication between spatially distant locations are possible. In general, however, broader transmission band is available for cable communications systems than wireless communications systems. Accordingly, wireless transmission of information having a large amount of data will take a longer time.

In contrast, with a cable data transmission system, a time required for sending data is shorter than with wireless data transmission, but it is difficult or impossible to receive data at a spatially distant location.

Wireless data transmission and cable data transmission have been used independent of each other and have not been used in association with each other. Accordingly, advantageous properties of wireless and cable transmission systems have not been efficiently utilized.

An object of the present invention is to provide an information device system which can provide advantages of wireless transmission when it is used for wireless communications, while providing advantages of cable transmission when it is used for cable communications.

SUMMARY OF THE INVENTION

An information device system according to the present invention includes a first information device having first cable communication means and first wireless communication means. The first information device is preferably a portable device. The second information device includes second cable communication means, which, when connected to the first cable communication device, communicates with the first cable communication device. The second information device further includes second wireless communication means, which, when it is within an effective range for communications with the first wireless communication device, can communicate with the first wireless communication means. This effective range for communication is referred to as effective communicative range hereinafter.

The second information device further includes judgment means for judging which state the system is in, a cable communication state in which the first and second cable communication means can communicate with each other, a wireless communication state in which the first and second wireless communication means can communicate with each other, or a non-communication state, other than the cable and wireless communication states. The second information device also includes restriction means for changing the degree of restriction placed on the processing executed by the second information device in accordance with the result of the judgment made by the judgment means. The processing the second information device can execute includes starting of applications the second information device is installed with, communications via networks, accessing to the Internet, etc. In other words, the right to access the second information device differs, depending on the state the system is in, the cable communication state, the wireless communication state, or the non-communication state, with the restriction on the access right increasing from the cable communication state toward the non-communication state.

The judgment means and restriction means may be realized by recording, for example, a judgment step and restriction step in a recording medium the second information device can read, and reading the recorded steps by the second information device. The judgment step is for judging which state the system is in, the cable communication state, the wireless communication state, or the non-communication state, and the restriction step is for variably restricting the processing the second information device can do, in accordance with the result of the judgment made in the judgment step. These steps are read from the recording medium into the second information device and function as the previously described judgment means and restriction means.

With the above-described arrangement, the system is judged as to which state it is in, the cable communication state, the wireless communication state, or the non-communication state. When it is judged that the system is in the cable communication state, which means that the first and second information devices are in communication with each other through the first and second cable communication means, the user of the second information device carrying the first information device with him or her is by the second information device, and the user is operating the second information device. Accordingly, the restriction placed on the processing with the second information device is the least.

When it is judged that the system is in the wireless communication state, which means that the first and second information devices are communication with each other via the first and second wireless communication means, the user carrying the first information device is near the second information device, and someone other than the user is operating the second information device within a range in which the user can control the second information device. Accordingly, the processing the second information device can do is restricted to some extent.

When the system is judged to be in the non-communication state, which means that none of the first and second cable communication means and the first and second wireless communication means are being used for communications between the first and second information devices, the user with the first information device is remote from the second information device, and the second information device may be being used by some other person outside the user's control. Accordingly, the processing which can be done by the second information device is restricted most.

As described above, in a judgment step, it is judged as to which state the system is in, the cable communication state in which the first and second cable communication means are in communication with each other, the wireless communication state in which the first and second wireless communication means can communicate with each other, or the non-communication state other than the cable and wire communication states. In a processing restricting step, the degree of restriction placed on the processing the second information device can do is changed, with the largest restriction placed when the system is in the non-communication state, with the intermediate restriction placed when the system is in the wireless communication state, and with the least restriction placed when the system is in the cable communication state.

In the information device system according to the present invention, the security level for the second information device is changed, depending on the place where the user carrying the first information device is relative to the second information device. Therefore, only if the user have the second information device kept under his or her control, it never happens that other person may execute any processing the user does not want to be done by other person through the second information device.

The restricting means may include first determining means for determining whether the first cable communication means connected to the second cable communication means has permission to communicate with the second cable communication means, and second determining means for determining whether the first wireless communication means communicating with the second wireless communication means has permission to communicate with the second wireless communication means.

The first and second determining means may be provided by first and second determining steps recorded on a recording medium the second information device can read, and reading them by means of the second information device. The first determining step is for determining whether the first cable communication means connected to the second cable communication means has permission to communicate with the second cable communication means, and the second determining step is for determining whether the first wireless communication means communicating with the second wireless communication means has permission to communicate with the second wireless communication means.

Generally, information device systems of this type are mass-produced. Therefore, if the second information device of one information device system could communicate with the first information device of another information device system by cable or wirelessly, resulting in relaxation of restriction placed on the processing through the second information device of the one information device system, the security of the second information device would not be obtained. To prevent it, it is determined whether the communications between the first and second cable communication means are permitted ones, and whether the communications between the first and second wireless communication means are permitted ones. If the communications between the first and second cable communication means or between the first and second wireless communication means are found not to have been permitted, the same restriction is placed on the processing through the second information device, as the system is judged to be in the non-communication state, so that the security is retained.

The second information device which include network communication means for communicating with a network may be modified to include judgment means for judging the state which the system is in, a cable communication state in which the first and second cable communication means can communicate with each other, a wireless communication state in which the first and second wireless communication means can communicate with each other, or a non-communication state, other than the cable and wireless communication states, and also altering means for altering awareness information to be supplied by the network communication means to the network, in accordance with the result of judgment made by the judgment means.

Both of the judgment means and the altering means may be realized by recording judgment and altering steps in a recording medium which the second information device can read, and reading the recorded steps by the second information device. The judgment step is for judging which state the system is in, the cable communication state, the wireless communication state, or the non-communication state. The altering step is for altering awareness information to be supplied by the network communication means to the network, in accordance with the result of judgment made in the judgment step.

When the user carrying the first information device is by the second information device and connects the first cable communication means of the first information device to the second cable communication means of the second information device, the system is judged to be in the cable communication state. If the user carrying the first information device is remote from but within an effective communicative range with respect to the second information device, the system is judged to be in the wireless communication state. If the user carrying the first information device is outside of the effective communicative range, the system is judged to be in the non-communication state. Depending on the judgment, different awareness information is supplied to the network.

As described, judgment is made, in a judgment step, as to which communication state the system is in, the cable communication state in which the first and second cable communication means are communicating with each other, the wireless communication state in which the first and second wireless communication means are communicating with each other, or the non-communication state other than the cable and wireless communication states, and based on the judgment made in the judgment step, the awareness information to be sent to the network from the second information device is altered in an altering step.

A person who is communicating with the second information device via the network can know the awareness information of the user as altered and, therefore, can know in what situation the user carrying the first information device is.

An information device system according to another aspect of the present invention includes first and second information devices. Preferably, the first information device is a portable one. The first information device includes first cable communication means and first wireless communication means. The second information device includes second cable communication means, which, when connected to the first cable communication device, communicates with the first cable communication device. The second information device further includes second wireless communication means, which, when it is within an effective range for communications with the first wireless communication device, can communicate with the first wireless communication means. The transmission band for the communications between the first and second cable communication means is broader than the transmission band for the communications between the first and second wireless communication means. The second information device further includes judgment means for judging which communication state the system is in, a cable communication state in which the first and second cable communication means can communicate with each other, a wireless communication state in which the first and second wireless communication means can communicate with each other, or a non-communication state, other than the cable and wireless communication states. Further, the second information device includes control means for causing information to be transmitted from the second cable communication means to the first cable communication means when the judgment means judges that the system is in the cable communication state, and causing information with the amount of data thereof reduced to be transmitted from the second wireless communication means to the first wireless communication means when the system is judged to be in the wireless communication state. The information to be transmitted may include picture data and/or audio data. The reduction of the amount of data may be done, for example, by a data compression technique.

The judgment and control means may be realized by recording a judgment step and a control step in a recording medium which the second information device can read and reading these steps by means of the second information device. The judgment step is for judging the state which the system is in, the cable communication state in which the first and second cable communication means are in communication with each other, or the wireless communication state in which first and second wireless communication means are in communication with each other. The control step includes a cable transmission step for causing information to be transmitted from the second cable communication means to the first cable communication means when the system is judged to be in the cable communication state in the judgment step, and a wireless transmission step for causing information with the amount of data thereof to be transmitted from the second wireless communication means to the first wireless communication means when the system is judged to be in the wireless communication state.

With this arrangement, in the judgment step, judgment is made as to whether the system is in the wireless communication state, in which the first and second wireless communication means are within the effective communicative range and, therefore, can communicate with each other, or the system is in the cable communication state, in which the first and second cable communication means are connected to each other for communications with a transmission band broader than the transmission band in the wireless communication state. When the system is judged to be in the cable communication state, the second cable communication means is caused to send information to the first cable communication means in the cable transmission step. If the system is judged to be in the wireless communication state, the second wireless communication means is caused to send information with the amount of data thereof reduced to the first wireless communication means.

When the first cable communication means of the first information device is connected with the second cable communication means of the second information device, the system is judged to be in the cable communication state, and information is transmitted from the second cable communication means to the first cable communication means. This information transmission is done, using a broad transmission band, and, therefore, even information of a large amount of data can be transmitted smoothly, and sufficient amount of information can be transmitted. When the first and second wireless communication means are judged to be in the wireless communication state, information, of which data amount is reduced, is transmitted from the second wireless communication means to the first wireless communication means. Although the transmission band is narrower, sufficient information can be sent. According to this feature of the present invention, when the system is in the wireless connection, sufficient information can be transmitted with advantages obtainable by wireless communication retained, while, in the cable connection, enough information can be transmitted.

DETAILED DESCRIPTION OF THE EMBODIMENTS

Figure 1:
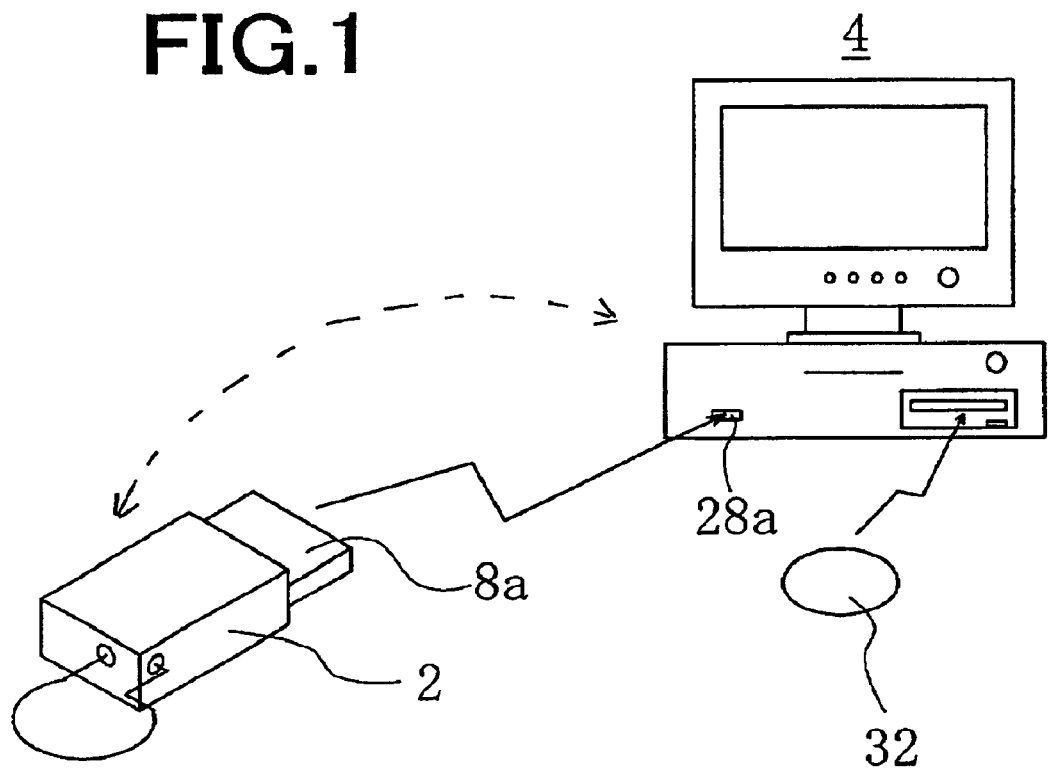
FIG. 1 shows an overall arrangement of an information device system according to a first embodiment of the present invention.

An information device system according to a first embodiment of the present invention includes, as shown in FIG. 1, a first information device, for example, a terminal device 2, and a second information device, for example, a personal computer 4.

Figure 2:
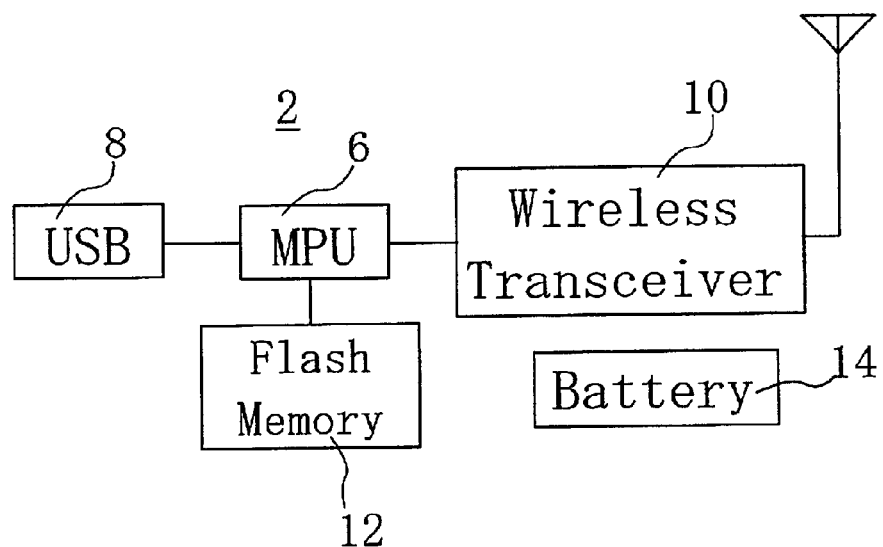
FIG. 2 is a block diagram of a terminal device useable in the information device system of FIG. 1.

As shown in FIG. 1, the terminal device 2 is a small-sized card-type one which a user can carry with him or her. As shown in FIG. 2, the terminal device 2 has a microprocessor 6, which is connected to first cable communication means, e.g. a USB interface 8, and to first wireless communication means, e.g. a Bluetooth transmitter-receiver (transceiver) circuit 10. The USB interface 8 is connected to a USB connector 8a shown in FIG. 1.

The microprocessor 6 operates in accordance with a program stored in a built-in program memory to control the USB interface 8 and the transceiver circuit 10. Data obtained through the transceiver circuit 10 and the USB interface 8 is stored in memory means, e.g. a flash memory 12.

The terminal device 2 also includes a battery 14 for operating the microprocessor 6 and the other components.

Figure 3:
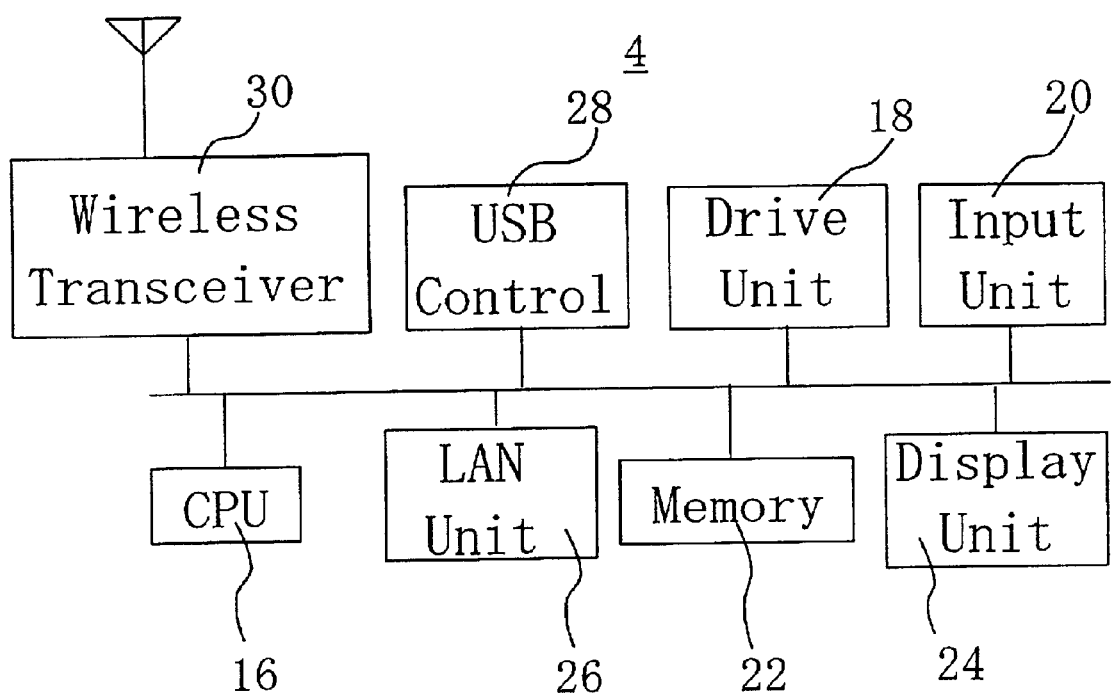
FIG. 3 is a block diagram of a personal computer useable in the information device system of FIG. 1.

As shown in FIG. 3, the personal computer 4 has a CPU 16, a drive unit 18, an input unit 20, a memory 22 and a display unit 24. The drive unit 18 is composed of a hard disc, a floppy disc drive, a CD-ROM drive etc., and the input unit 20 is composed of a keyboard, a mouse etc. The personal computer 4 further includes a communication unit, e.g. a LAN unit 26, so that it can communicates with a network, e.g. a LAN network. Also, the personal computer 4 includes second cable communication means, e.g. a USB controller 28, and second wireless communication means, e.g. a Bluetooth transmitter-receiver (transceiver) circuit 30. The transceiver circuit 30 is adapted to be capable of communicating with the transceiver circuit 10 of the terminal device 2 when the terminal device 2 is within an effective communicative range for communications with the personal computer 4. The USB controller 28 is connected to a USB connector 28a disposed on the personal computer 4.

The personal computer 4 operates under the control of an operating system stored on the hard disc. The personal computer 4 reads a program stored on a recording medium, e.g. a CD-ROM 32, shown in FIG. 1, into the hard disc by means of the CD-ROM drive in the drive unit 18, and executes the program.

When the USB connector 8a of the terminal device 2 is connected to the USB connector 28a of the personal computer 28a, the terminal device 2 and the personal computer 4 are in a condition in which they can communication with each other via cable. When the terminal device 2 is remote from the personal computer 4, communications through cable between them may be not possible, but wireless communications are available between the transceiver circuit 10 of the terminal device 2 and the transceiver 30 of the personal computer 4 if they are within the effective communicative range. If the terminal device 2 goes out of the effective communicative range, wireless communications are impossible.

The program (state controlling software) read in from the CD-ROM 32, which may be sold with the terminal device 2, is resident in the memory 22, and it is initiated each time any of various events occurs. An event occurs when the terminal device 2 and the personal computer 4 are connected wirelessly or by cable, and when the wireless or cable connections are cut.

Figure 4:
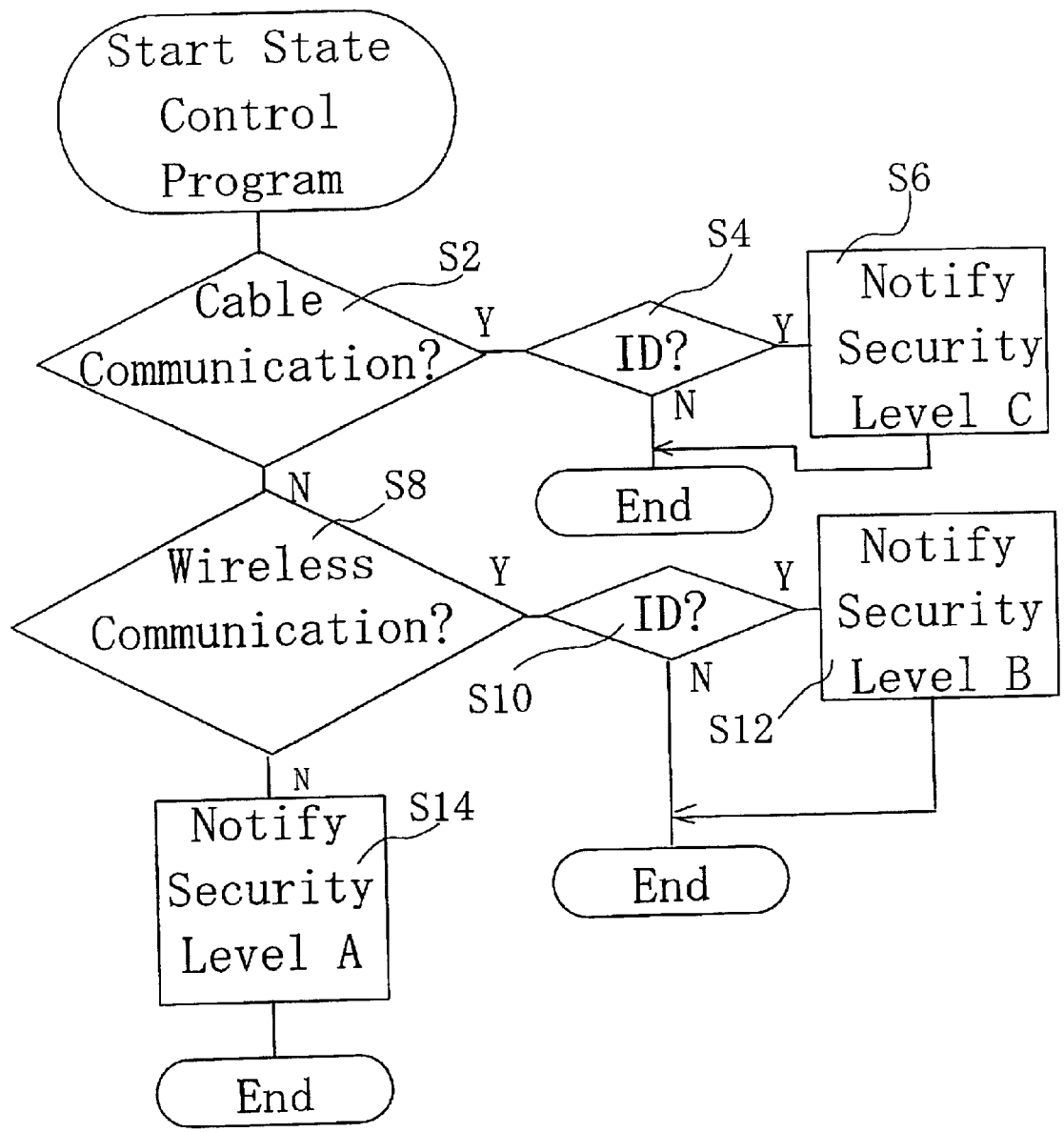
FIG. 4 is a flow chart of a state controlling program executed by the personal computer of FIG. 3.

With this state control software, as shown in FIG. 4, whether or not the terminal device 2 and the personal computer 4 are connected via cable is determined first (Step S2). This determination can be made by determining whether the even which has started the state controlling software has occurred because of the USB connection, by seeing parameters associated with the event.

If it is determined that the cable connection has been established (Y), an identifier determination is done (Step S4). In this Step S4, a determination is made as to whether the identifier transmitted through the USB interface 8 of the terminal device 2 connected to the personal computer 4 is an identifier of a terminal device which is authorized to communicate with the personal computer 4. Since data relating to the identifiers of those terminal devices which have been authorized to communicate with the personal computer 4 have been stored in the memory 22 beforehand, the identifier determination is made with reference to the stored data.

If the identifier determination step reveals that the terminal device sending the identifier is not an authorized device, the state controlling software ends the processing. In this way, the use of the personal computer 4 through a terminal device of an unauthorized person can be prevented.

If, on the other hand, the identifier is judged to be from an authorized terminal device 2, a security level C is notified to the operating system (Step S6), and the state controlling software ends.

If it has been judged that the cable connection has not been made (N) in Step S2, whether the terminal device 2 and the personal computer 4 have been wirelessly connected with each other is determined (Step S8). This determination, too, can be made by determining whether the event that has started the state controlling software has been caused by wireless connection or not, by seeing parameters associated with that event.

If the terminal device 2 is judged to have been connected wirelessly to the personal computer 4, an identifier determination step is carried out (Step S10). In this step, it is determined whether the identifier transmitted wirelessly from a terminal device connected to the personal computer 4 is an identifier of a terminal device authorized to communicate with the personal computer 4. Since data relating to the identifiers of those terminal devices which have been authorized to wirelessly communicate with the personal computer 4 have been stored in the memory 22 beforehand, the identifier determination is made with reference to the stored data.

If the terminal device wirelessly connected to the personal computer 4 has been judged not to be authorized to wireless communicate with the personal computer 4, the state controlling software is terminated. Therefore, the use of the personal computer 4 through terminal devices of unauthorized persons can be prevented.

If the identifier determination step proves that the terminal device 2 connected to the personal computer 4 is an authorized device, the operating system is notified that the security level is B (Step S12), and the state controlling software is terminated.

If it is judged that no wireless connection has been established in Step S8, a security level A is notified to the operating system, and the state controlling software is terminated.

This state controlling software makes judgment regarding the wireless connection after it determines that the terminal device 2 and the personal computer 4 are not connected by cable. Therefore, if the terminal device 2 is connected both wirelessly and by cable to the personal computer 4, priority is given to the judgment that they are connected by cable, so that the notification of the security level C is given.

Steps S2 and S4 correspond to the judgment means, and Steps S4, S6, S10, S12 and S14 correspond to the restriction means.

Depending on the security level notified to the operating system, the processing the personal computer 4 can do is restricted differently. For example, access to files may be restricted in accordance with the security level in the following manner.

When the security level A is notified to the operating system, the operating system causes the operation of the personal computer 4 to be suspended, or activates the screen saver function, whereby a person other than the authorized person cannot access the personal computer 4.

If the security level B is notified to the operating system, the operating system first advises the user to log in. Unless log-in information including registered ID and password is entered, the processing same as the one done for the security level A is done. If the registered log-in information is entered, access to files predetermined for the security level B are permitted. For example, at the security level B, only read-out from files is permitted, and no write-in is permitted. Alternatively, it may be so arranged that read-out and write-in from and into files in particular directories may be permitted, but neither read-out nor write-in from and into files in other directories are inhibited.

When the security level C is notified to the operating system, it advises the user to log in. Unless the registered ID and password are entered, the processing same as the processing done in response to the security level A is done. If the registered ID and password are inputted, the restriction imposed on the access rights is most lessened. For example, read-out and write-in from and into all the files are permitted.

The access to networks may be restricted in accordance with the security level. If the security level A is notified to the operating system, the operating system operates to cause the operation of the personal computer 4 to be suspended, or activates the screen saver function, whereby a person other than the authorized person cannot access the personal computer 4.

If the security level B is notified to the operating system, the operating system advises the user to log in. Unless the user inputs his or her registered log-in information, the same processing as for the security level A is done. On the other hand, if the registered log-in information is inputted, access to networks predetermined for the security level B is permitted. For example, only read-out from a particular file on a file server is permitted.

In response to the notification of the security level C, the operating system advises the user to log in. If the registered log-in information is inputted, the system is placed in the condition for the security level C in which the least restriction is imposed on the access rights. In this condition, for example, read-out and write-in out of and into all the files on the file server are made available. Without the registered log-in information inputted, the processing same as the one done in response to the security level A is done.

Alternatively, applications which can be started may be restricted in accordance with the security level. When the operating system receives the notification of the security level A, its operation is suspended, or it activates the screen saver function so as to prevent a person other than the authorized person from accessing to the personal computer 4.

In response to the notification of the security level B, the operating system advises the user to log in. If the inputted log-in information is not registered one, the processing same as done for the security level A is performed. If the registered log-in information is inputted, activation of applications predetermined for the security level B is permitted.

In response to the notification of the security level C, the operating system advises the user to log in. If the user inputs the registered ID and password, activation off all of the applications is permitted due to the security level C. Inputting of unregistered ID and password causes the same processing as done in response to the security level A to take place.

Instead of advising the user to log in when restricting the access to files or activation of applications in response to the security level B or C, the operating system may cause the screen saver function to be activated and advise the user to input a password. When the registered password is inputted, the operating system stops the screen saver function and gives permission to access the files or activate the applications corresponding to the security level notified to the operating system. Alternatively, instead of advising the user to log in and input the password when restricting the access to files or activation of applications in response to the security level B or C, the operating system may immediately give permission to access the files or activate the applications predetermined for the security level B or C.

Contents which can be viewed through a browser may be restricted in a manner corresponding to each of the security levels. In this case, the notification of the security level from the state controlling program is sent not to the operating system, but to the browser software. The browser software is so configured as to be able to alter the control level of the viewable contents. When the security level A is notified, the browser sets such a control level as to make no contents viewable. When the security level B is notified, a control level is set to inhibit a person from accessing web sites of which contents are of, for example, pornography and violence. In response to the notification of the security level C, a control level permitting a person to view the contents of any web sites is set.

Communications through a chat application can be controlled in response to the security level. In this case, too, the notification of the security level is not sent to the operating system, but to the chat application. When the security level A is notified, the chat application notifies a person who has contacted the user of the personal computer 4 that the user is away. When the security level is B, the chat application notifies the person on the other side of the line that the user is near the personal computer 4, but is not at the desk. If the security level C is notified, the chat application notifies the person who has contacted that the user is at the desk.

As described above, the content of awareness information to be supplied to other persons to communicate with is altered, depending on what communication state the personal computer 4 is in, the cable communication state, the wireless communication state, or the non-communication state.

Figure 5:
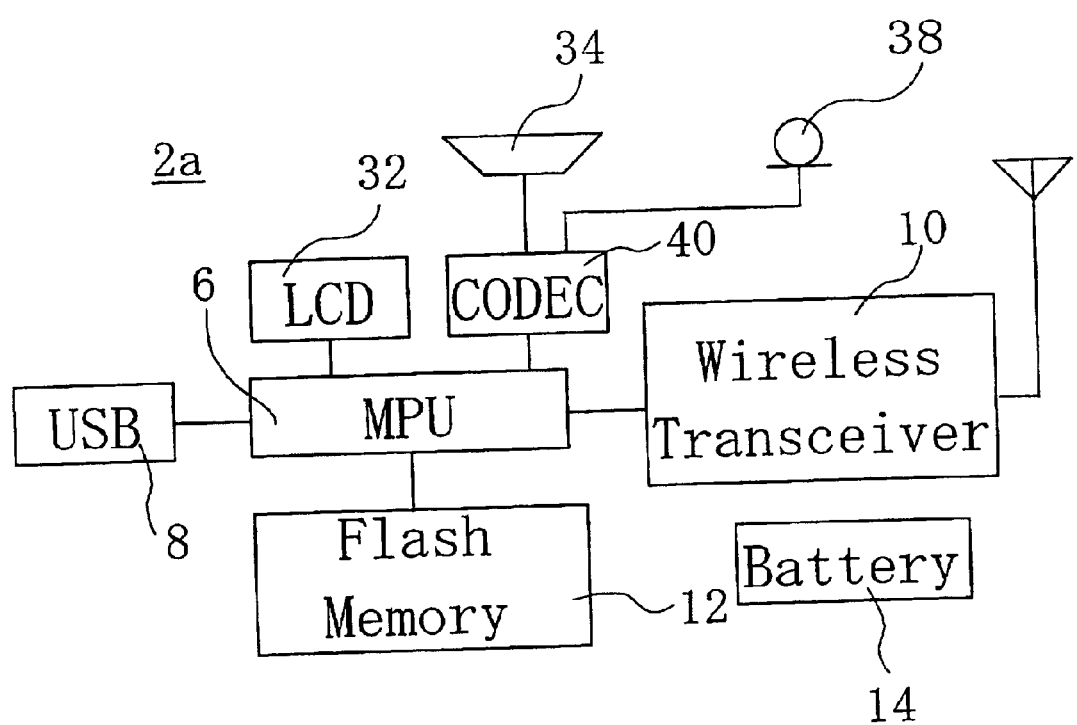
FIG. 5 is a block diagram of a terminal device useable in an information device system according to a second embodiment of the present invention.

An information device system according to a second embodiment of the present invention is shown in FIG. 5. As shown, the configuration of a terminal device 2a is different from that of the terminal device 2 of the first embodiment shown in FIG. 2. Like the terminal device 2 shown in FIG. 2, the terminal device 2a includes a microprocessor 6, a USB interface 8, a transmitter-receiver (transceiver) circuit 10, a flash memory 12 and a battery 14, which are the like components with the same reference numerals shown in FIG. 2. The terminal device 2a further includes reproduced data output means, e.g. picture display means and audio output means. A LCD 32 may be used as the picture display means, and a loudspeaker 34 may be used as the audio output means. The terminal device 2a further includes reproduced data providing means, e.g. audio input means. The audio input means may be, for example, a microphone 38.

A sound signal from the microphone 38 is processed in, for example, a CODEC 40, and the processed sound signal is applied to the microprocessor 6. The sound signal is transmitted by cable or wirelessly to the personal computer 4 (FIG. 1).

A sound signal sent by cable or wirelessly from the personal computer 4 to the terminal device 2a is processed in the CODEC 40 and outputted through the loudspeaker 34. Similarly, a picture signal sent by cable or wirelessly to the terminal device 2a from the personal computer 4 is processed in the microprocessor 6 and is displayed on the LCD 32.

It is so arranged that on the personal computer 4 side, too, sound and/or picture signal sent thereto from the terminal device 2a by cable or wirelessly can be reproduced.

When transferring data, such as sounds and pictures, from, for example, the personal computer 4 to the terminal device 2a, a transfer program read into the memory 22 in the personal computer 4 from a CD-ROM sold with the terminal device 2a is started.

Figure 6:
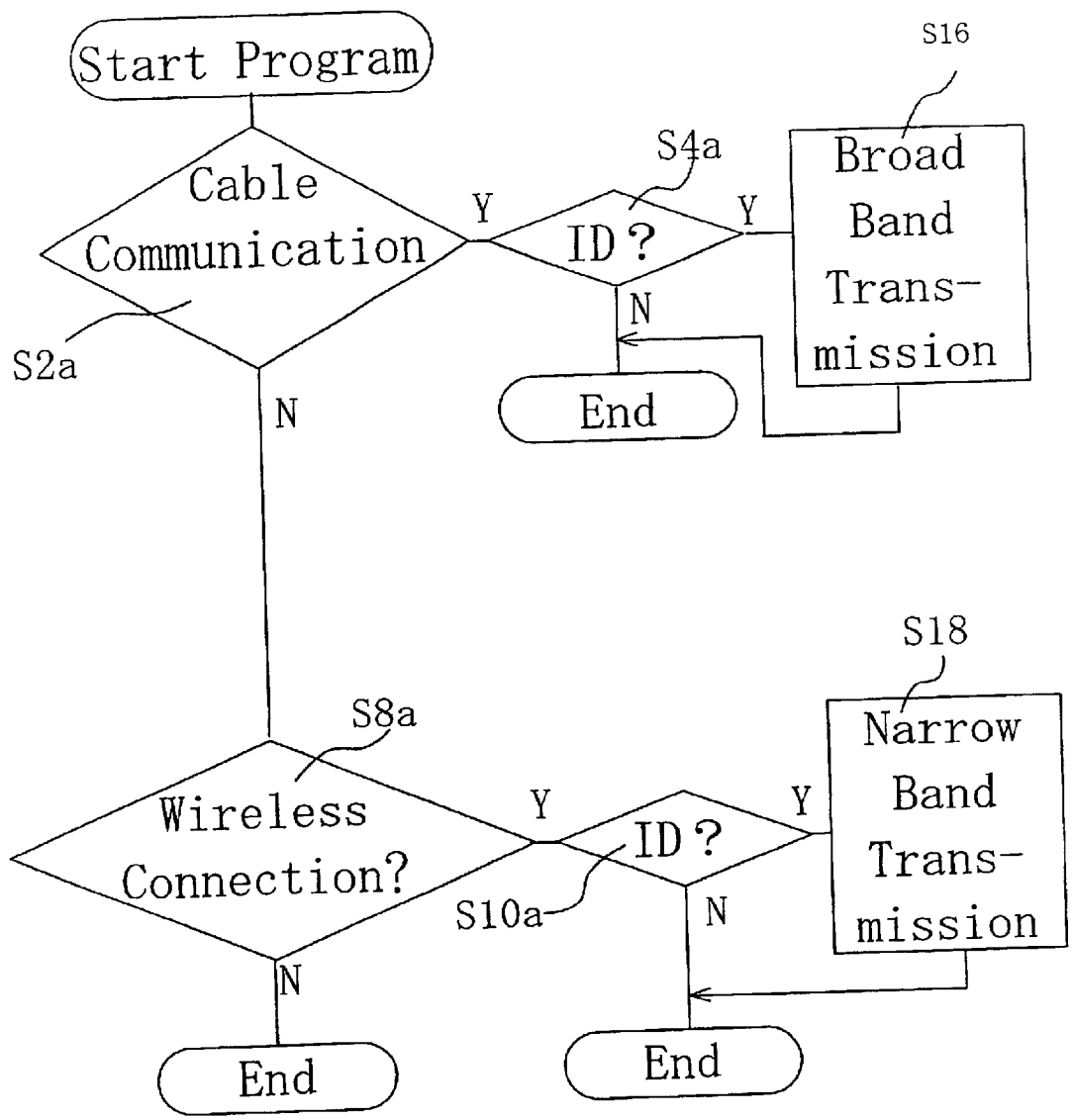
FIG. 6 is a flow chart of a transmission program executed by a personal computer useable in the information device system of FIG. 5.

As shown in FIG. 6, according to this program, whether the terminal device 2a and the personal computer 4 are connected with each other by cable or wirelessly is judged (Step S2a). If they are connected by cable, an identification determining step like Step S4 of the first embodiment is executed (Step S4a). If the identifier indicates that the device connected to the personal computer 4 is the terminal device 2a authorized to communicate with the personal computer 4, the data is transmitted by cable, using a broad transmission band (Step S16).

If it is judged that the terminal device 2a and the personal computer 4 are not connected with each other by cable, in Step S2a, a judgment is made, as in Step S8, as to whether or not they are connected wirelessly (Step S8a). If it is determined that the terminal device 2a and the personal computer 4 are connected wirelessly with each other, the identifier determination, like the one done in Step S10 of the first embodiment, is performed (Step S10a). If it is judged in Step S10a that the terminal device 2a authorized to communicate with the personal computer 4 is wirelessly connected, narrow band data transmission is done wirelessly (Step S18).

In an application, such as video conference, in which information including pictures and sounds is handled, a broad band transmission is employed to transmit both picture and sound signals by cable without reducing the amount of data. The picture is displayed on the LCD 32 at the terminal device 2a, and the sound is outputted through the loudspeaker 34.

In a narrow band transmission, the amount of data to be transmitted is reduced before transmission. For example, the picture quality is reduced or the number of video frames may be reduced before transmitting the picture to the terminal device 2a. As for the sound, the sound quality is lowered and transmitted to the terminal device 2a. The picture is displayed on the LCD 32, while the sound is reproduced through the loudspeaker 34.

A picture signal and a sound signal taken by the personal computer 4 from the Internet or from digital television broadcast are transmitted to the terminal device 2a, by cable through a broad band and wirelessly over a narrow band. It may be so arranged that only one of the picture and sound signals can be transmitted.

The terminal device 2a similarly has the above-described transfer program read into it. A sound signal representing sounds collected by the microphone 38 is transmitted by cable, using a broad band, and wirelessly over a narrow band. In the narrow band transmission, the microprocessor 6 converts the sound signal into a text and is transmitted in the text form. In the broad band transmission, the sound signal is transmitted without being modified.

If the terminal device 2a has a function of a sound memo pad, the sound signal is stored in a sound file in the flash memory 12 of the terminal device 2a. In a narrow band transmission, only part of the sound file is transmitted, together with day and time information, to the personal computer. In a broad band transmission, the whole sound file stored is transmitted.

In the above-described embodiments, a USB is employed as cable communication means, but other cable communication means, such as IEEE 1394 and PCMCIA and direct wire, or wired (e.g. telephone) connections, may be used.

Also, instead of Bluetooth, other wireless communication means, e.g. wireless LAN, may be used.

In the first embodiment, a state controlling program is used to notify the operating system of the security level A, B or C. Instead, the security level may be written in a memory which the operating system accesses at times.

In the second embodiment, only a sound signal has been stated to be transmitted from the terminal device 2a, but a picture signal may be transmitted, too. In such a case, when a picture signal is to be transmitted wirelessly, the picture may be transmitted with the amount of data reduced by lowering the picture quality or reducing the number of picture frames, whereas the picture is transmitted without reducing the amount of data.

As various changes could be made in the above without departing from the scope of the invention, it is intended that all matters contained in the above description and shown in the accompanying drawings shall be interpreted as illustrative and not in a limiting sense.

What is claimed is:

1. An information device system comprising:
   a first information device having first cable communication means and first wireless communication means; and
   a second information device having second cable communication means which, when connected to said first cable communication means, is adapted to communicate with said first cable communication means, and second wireless communication means which, when in an effective communicative range with said first wireless communication means, is adapted to communicate with said first wireless communication means;
   wherein said second information device further comprises:
   judgment means for judging which state said information device system is in, a cable communication state in which said first and second cable communication means can communicate with each other, a wireless communication state in which said first and second wireless communication means can communicate with each other, or a non-communication state, different from said cable and wireless communication states; and
   restriction means for increasing a degree of restriction to be placed on processing performed by said second information device from a lowest degree of restriction imposed when said judgment means judges that said information device system is in said cable communication state, through an intermediate degree of restriction imposed when said judgment means judges that said information device system is in said wireless communication state, to a highest degree of restriction imposed when said judgment means judges that said information device system is in said non-communication state.

2. A processing restricting method in an information device system including a first information device having first cable communication means and first wireless communication means and a second information device having second cable communication means and second wireless communication means, said method comprising:
   a judgment step for judging which state said information device system is in, a cable communication state in which said first and second cable communication means are connected with each other for cable communications therebetween, a wireless communication state in which said first and second wireless communication means are in an effective communicative range and are connected with each other for wireless communications therebetween, or a non-communication state other than said cable and wireless communication states; and
   a processing restricting step for increasingly restricting processing said second information device can do from a lowest degree of restriction imposed when said information device system is judged to be in said cable communication state, through an intermediate degree of restriction imposed when said information device system is judged to be in said wireless communication state, to a highest degree of restriction imposed when said information device system is judged to be in said non-communication state.

3. A record medium which a second information device can read, said second information device having second cable communication means which, when connected to first cable communication means of a first information device, is adapted to communicate with said first cable communication means, and having second wireless communication means which, when in an effective communicative range with first wireless communication means of said first information device, is adapted to communicate with said first wireless communication means;

said record medium causing a judgment step and a processing restricting step to be executed by said second information device;

said judgment step being for judging which state said information device system is in, a cable communication state in which said first and second cable communication means are connected with each other for cable communications therebetween, a wireless communication state in which said first and second wireless communication means are in an effective communicative range and are connected with each other for wireless communications therebetween, or a non-communication state other than said cable and wireless communication states;

said processing restricting step being for increasingly restricting processing said second information device can do from a lowest degree of restriction imposed when said information device system is judged to be in said cable communication state, through an intermediate degree of restriction imposed when said information device system is judged to be in said wireless communication state, to a highest degree of restriction imposed when said information device system is judged to be in said non-communication state.

4. An information device system comprising:

a first information device having first cable communication means and first wireless communication means; and a second information device having second cable communication means which, when connected to said first cable communication means, is adapted to communicate with said first cable communication means, second wireless communication means which, when in an effective communicative range with said first wireless communication means, is adapted to communicate with said first wireless communication means, and means communicating with a network;

wherein said second information device further comprises:

judgment means for judging which state said information device system is in, a cable communication state in which said first and second cable communication means can communicate with each other, a wireless communication state in which said first and second wireless communication means can communicate with each other, or a non-communication state, other than said cable and wireless communication states; and altering means for providing awareness information to other information device through said network, and altering said awareness information in accordance with the judgment made by said judgment means.

5. An information device system comprising:

a first information device having first cable communication means and first wireless communication means; and a second information device having second cable communication means which, when connected to said first cable communication means, is adapted to communicate with said first cable communication means, and second wireless communication means which is adapted to communicate with said first wireless communication means when said first wireless communication means is in an effective communicative range;

the transmission band for communications between said first and second cable communication means being broader than the transmission band for communications between said first and second wireless communication means;

said second information device further comprising:

judgment means for judging which state said information device system is in, a cable communication state in which said first and second cable communication means can communicate with each other, or a wireless communication state in which said first and second wireless communication means can communicate with each other; and control means for causing said second cable communication means to transmit information to said first cable communication means when said judgment means judges that said information device system is in said cable communication state, and causing said second wireless communication means to transmit information with a reduced amount of data.

* * * * *